(12) United States Patent
Johnston et al.

(10) Patent No.: US 6,265,027 B1
(45) Date of Patent: Jul. 24, 2001

(54) ENHANCED SURFACE FOR WOOD

(75) Inventors: Robert William Johnston, Vandalia; Kimberly Ann Whitley, Hamilton; Louis Paul Schaefer, Cincinnati, all of OH (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/570,635

(22) Filed: May 15, 2000

(51) Int. Cl.$^7$ .......................................................... B05D 7/08
(52) U.S. Cl. .......................... 427/368; 427/393; 427/408
(58) Field of Search ................................... 427/368, 393, 427/408

(56) References Cited

U.S. PATENT DOCUMENTS

| | | |
|---|---|---|
| 4,011,195 | 3/1977 | Self . |
| 4,557,889 | 12/1985 | Masuda et al. . |
| 5,358,779 | 10/1994 | McGarry . |
| 5,371,117 | 12/1994 | Parish et al. . |
| 5,373,036 | 12/1994 | Parish et al. . |
| 5,374,669 | 12/1994 | Parish et al. . |
| 5,549,969 | 8/1996 | Parish . |
| 5,843,221 | 12/1998 | Parish . |

*Primary Examiner*—Erma Cameron
(74) *Attorney, Agent, or Firm*—Killworth, Gottman, Hagan & Schaeff, L.L.P

(57) ABSTRACT

A method for treating wood surfaces. The wood surface is coated with a coating including (a) a filler/primer component comprising a mixture of from about 20% to about 50% by weight of the filler/primer component of a resin selected from vinyl ester resins and vinyl ester resins in combination with polyester resins, from about 5% to about 35% by weight of the filler/primer component of a sprayable filler selected from calcium carbonate, talc, and combinations thereof, from about 5% to about 10% by weight of the filler/primer component of pigment, from about 1% to about 15% by weight of the filler/primer component of a mixture of thixotropic clays, from about 0% to about 2% by weight of the filler/primer component of activated fumed silica, from about 1% to about 10% by weight of the filler/primer component of a phosphosilicate, from about 0% to about 2% by weight of the filler/primer component of an accelerator, and from about 0% to about 20% by weight of the filler/primer component of an organic solvent, and (b) a catalyst component.

22 Claims, No Drawings

ENHANCED SURFACE FOR WOOD

BACKGROUND OF THE INVENTION

This invention relates generally to a method for treating wood surfaces with a sprayable coating composition to produce a smooth finish.

Typically, during preparation of a wood surface, such as wood fiberboard, for finishing, the wood grain is raised. The raised grain requires several coating and sanding steps to produce an acceptably smooth surface. First, a filler is applied to the surface, and the surface is sanded. Then, a primer is applied, and the surface is sanded again. Finally, a top coat is applied. This process, with its multiple coating and sanding steps, is time-consuming. In addition, the process still results in a part rejection rate of about 10%.

Thus, the need remains for an improved method for treating wood surfaces.

SUMMARY OF THE INVENTION

This need is met by the present invention which provides a method for treating wood surfaces. The wood surface is coated with a coating including (a) a filler/primer component comprising a mixture of from about 20% to about 50% by weight of the filler/primer component of a resin selected from vinyl ester resins and vinyl ester resins in combination with polyester resins, from about 5% to about 35% by weight of the filler/primer component of a sprayable filler selected from calcium carbonate, talc, and combinations thereof, from about 5% to about 10% by weight of the filler/primer component of a pigment, from about 1% to about 15% by weight of the filler/primer component of a mixture of thixotropic clays, from about 0% to about 2% by weight of the filler/primer component of activated fumed silica, from about 1% to about 10% by weight of the filler/primer component of a phosphosilicate, from about 0% to about 2% by weight of the filler/primer component of an accelerator, and from about 0% to about 20% by weight of the filler/primer component of an organic solvent, and (b) a catalyst component.

The catalyst component may be present in an amount of from about 1% to about 50%, and preferably 2% to 4% by weight of the total coating (filler/primer component and catalyst) as applied. That is, preferably the filler/primer component comprises about 96% to 98% by weight the total coating, and the catalyst component comprises about 2% to about 4% by weight of the total coating.

The accelerator is preferably selected from dimethyl aniline, cobalt naphthenate, copper naphthenate, potassium hexanoate, dimethyl para toluidine, cobalt neodecanoate, and mixtures thereof. The accelerator preferably comprises from about 0.2% to about 2% by weight of the filler/primer component.

The filler/primer component may further include about 0% to about 12% styrene monomer by weight of the filler/primer component.

When the resin in the filler/primer component is a combination of a vinyl ester resin and a polyester resin (the polyester resin is preferably present in an amount of about 2% to about 10% by weight of the filler/primer component), there may also be about 0 to about 8% by weight of the filler/primer component of an acrylic resin.

The solvent is preferably a blend of 50% acetone and 50% ethyl acetate. The solvent is preferably present in an amount of about 10% to about 20% by weight of the filler/primer component.

The phosphosilicate is preferably calcium strontium zinc phosphosilicate.

DETAILED DESCRIPTION OF THE INVENTION

The coating for the wood substrate, as applied, comprises a filler/primer component including a resin selected from vinyl ester resins and the combination of vinyl ester resins and polyester resins. Such resins provide fast curing and good adhesion. Suitable polyester resins are available from Reichhold Chemicals, Inc. of Research Park Triangle, Durham, N.C. under the Polylite trademark and the designation 32–366, which is a mixture of a maximum of 69.5% of a proprietary polyester resin and 36% of a styrene monomer (CAS#100-42-5), and which has a boiling point of 295° F., a volatile percentage of 31–36%, a vapor density heavier than air, and a specific gravity of 1.04. Suitable vinyl ester resins include 8084 vinyl ester, which is a mixture of 40–50% of a styrene monomer (CAS#000100-42-5) and the balance vinyl ester resin (CAS #068492-68-2), and which has a boiling point of 294° F., a vapor pressure of 7 mm Hg at 20° C., a vapor density of 3.6 based on styrene, and a specific gravity of 1.010–1.035, and 411–35 vinyl which is a mixture of 35–50% of a styrene monomer (CAS#000100-42-5) and the balance vinyl ester resin (CAS 036425-16-8), and which has a boiling point of 294° F., a vapor pressure of 7 mm Hg at 20° C., a vapor density of 3.6 based on styrene, and a specific gravity of 1.025 to 1.075, both available from Dow Chemical Co. of Midland, Mich. under the Derakane trademark.

A styrene monomer is preferably included in the filler/primer component to increase the rate of polymerization and to reduce the viscosity of the composition. However, it should be noted in instances where vinyl esters alone are used as the resin, an encapsulated petroleum based wax may be used in place of some of the styrene. Suitable waxes include BYK S-740, available from Byk Chemie.

The thixotropic clays suitable for use in the filler/primer component of the present invention include prewet and dry organo clays. A suitable prewet clay is available from Rheox, Inc. under the tradename MPA-60-x. A preferred dry clay is quaternary ammonium bentonite, available from United Catalysts, Inc. under the trade name Advitrol 6–8. The prewet clay acts as an antisettling agent and provides thixotropic properties to the composition, while the dry clay provides fast shear viscosity and thixotropic properties.

Fumed silica is included in the filler/primer component to provide fast viscosity. It also acts as a thixotropic agent. Fumed silica is commercially available from DeGussa Co. under the trade name Aerosil 200. The fumed silica is preferably activated by the addition of ethylene glycol or glycerine.

The preferred fillers for the filler/primer conmponent of the present invention include talc and calcium carbonate. These fillers provide thixotropic properties to the composition and also aid in providing sanding properties to the coated wood substrate. A preferred talc is MP25-38 available from Barretts Minerals, Inc. Calcium carbonate is commercially available from Genstar under the trade name Camel Wite.

The filler/primer component also includes a pigment such as titanium dioxide to form a colored finish. Suitable titanium dioxide (Rutile) is available from SCM Chemicals under the designation Tiona RCL-9, other sprayable pigments such as carbon black, and black iron oxide can be used. The pigment should be present in an amount of from about 5% to about 10% by weight of the filler/primer component.

The filler/primer component preferably includes accelerating agents to speed up the curing time. Suitable accelerators include dimethyl aniline, available from DuPont under the designation N,N DMA, and cobalt naphthenate or cobalt neodecanoate, available from OMG Co., or Shephard Chemical.

The addition of a phosphosilicate, preferably calcium strontium zinc phosphosilicate, to the filler glazing component helps to assure the adhesion of the coating to the wood substrate, and adds to the durability of the coating.

The preferred organic solvent is a blend of 50% acetone and 50% ethyl acetate, although many organic solvents could be used.

The coating further includes a catalyst component. The catalyst component is preferably from about 1% to about 50% by weight of the total coating, more preferably from about 2% to about 4% by weight of the total coating. The catalyst is preferably selected from methyl ethyl ketone peroxide, benzoyl peroxide, boron trifluoride, polyamine, mercaptan, isobiurate, and isocyanurate, and more preferably is selected from a methyl ethyl ketone peroxide and a benzoyl peroxide.

One preferred filler/primer component of the coating includes: from about 20% to about 50% by weight of the filler/primer component of an a resin selected from vinyl ester resins and a mixture of a vinyl ester resin and a polyester resin; from about 5% to about 35% by weight of the filler/primer component of a filler; from about 5% to about 10% by weight of the filler/primer component of titanium dioxide; from about 1% to about 15% by weight of the filler/primer component of a mixture of thixotropic clays; from about 0% to about 2% by weight of the filler/primer component of activated fumed silica; from about 0% to about 10% by weight of the filler/primer component of a phosphosilicate; from about 0% to about 2% by weight of the filler/primer component of an accelerator selected from dimethyl aniline, cobalt naphthenate, copper naphthenate, potassium hexonoate, dimethyl para toluidine, cobalt neodecanoate, or mixtures thereof; and from about 0% to about 20% by weight of the filler/primer component of an organic solvent. The filler/primer component optionally includes from about 0% to about 12% by weight of the filler/primer component of a styrene monomer, and from about 0% to about 8% by weight of the filler/primer component of an acrylic resin when the main resin is a combination of a vinyl ester resin and a polyester resin.

More preferably, the filler/primer component includes: a combination of about 20% to about 30% by weight of the filler/primer component of a vinyl ester resin and from about 2% to about 10% by weight of the filler/primer component of a polyester resin; about 5% to about 10% by weight of the filler/primer component of a styrene monomer; about 5% to about 10% weight of the filler/primer component of titanium dioxide, from about 0.5 to about 2% by weight of the filler/primer component of an accelerator selected from dimethyl aniline, cobalt naphthenate, copper naphthenate, potassium hexanoate, dimethyl para toluidine, cobalt neodecanoate, and mixtures thereof, from about 25% to about 35% by weight of the filler/primer component of a filler such as talc; from about 1% to about 4% by weight of the filler/primer component of thixotropic clays; from about 0.5% to about 2% by weight of the filler/primer component fumed silica; from about 1% to about 10% by weight of the filler/primer component calcium strontium zinc phosphosilicate; from about 0% to about 0.8% by weight of the filler/primer component of an acrylic resin; and from about 10% to about 20% by weight of the filler/primer component of organic solvent.

The coating contains as a second component about 2% to about 4% by weight of the total coating of a catalyst component.

The coating of the present invention can be applied as indicated in U.S. Pat. No. 5,371,117, which is incorporated herein by reference. The coating is dry to touch in about 5–10 minutes, dry to handle in about 30 minutes, and recoatable in about 1 hour.

The coating has high build capabilities. The coating can build up to 12 mils in subsequent wet on wet coats without sagging or running and without causing mud-cracking due to deposition or otherwise greatly affecting the cure of the coating.

Because the coating has an unusually high pigment volume concentration, it has the ability to fill and bridge all the areas of concern. As a result, the method of the present invention reduces the number of steps needed to produce a smooth finish. Although the wood grain is raised by the coating, an acceptably smooth surface can be obtained simply by applying the coating, sanding, and applying the top coat, thus eliminating one coating and one sanding step.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A method of treating a wood surface comprising:
    providing the wood surface;
    coating the wood surface with a coating comprising:
        (a) a filler/primer component comprising:
            a mixture of from about 20% to about 50% by weight of the filler/primer component of a resin selected from vinyl ester resins and vinyl ester resins in combination with polyester resins;
            from about 5% to about 35% by weight of the filler/primer component of a sprayable filler selected from calcium carbonate, talc, and combinations thereof;
            from about 5% to about 10% by weight of the filler/primer component of pigment;
            from about 1% to about 15% by weight of the filler/primer component of a mixture of thixotropic clays;
            from about 0% to about 2% by weight of the filler/primer component of activated fumed silica;
            from about 1% to about 10% by weight of the filler/primer component of a phosphosilicate;
            from about 0% to about 2% by weight of the filler/primer component of an accelerator; and
            from about 0% to about 20% by weight of the filler/primer component of an organic solvent; and
        (b) a catalyst component.

2. The method of claim 1 wherein the catalyst component is selected from methyl ethyl ketone peroxide and benzoyl peroxide.

3. The method of claim 1 wherein the accelerator is selected from dimethyl aniline, cobalt naphthenate, copper naphthenate, potassium hexanoate, dimethyl para toluidine, cobalt neodecanoate, and mixtures thereof.

4. The method of claim 3 wherein the accelerator comprises from about 0.2% to about 2% by weight of the filler/primer component.

5. The method of claim 1 wherein the filler/primer component further comprises about 0% to about 12% by weight of the filler/primer component of a styrene monomer.

6. The method of claim 1 wherein the solvent is a blend of 50% acetone and 50% ethyl acetate.

7. The method of claim 6 wherein the solvent comprises about 10% to about 20% by weight of the filler/primer component.

8. The method of claim 1 wherein the phosphosilicate comprises calcium strontium zinc phosphosilicate.

9. The method of claim 1 wherein the catalyst component comprises about 2% to about 4% by weight of the total coating.

10. The method of claim 1 wherein said pigment is titanium dioxide.

11. The method of claim 1 further comprising:
   drying the coated wood surface;
   sanding the dried, coated wood surface; and
   coating the sanded, dried, coated wood surface with a top coat.

12. A method of treating a wood surface comprising:
   providing the wood surface;
   coating the wood surface with a coating comprising:
      (a) a filler/primer component comprising:
         a mixture of from about 20% to about 50% by weight of the filler/primer component of a combination of vinyl ester resin and polyester resin, wherein the polyester resin comprises about 2% to about 10% by weight of the filler/primer component;
         from about 5% to about 35% by weight of the filler/primer component of a sprayable filler selected from calcium carbonate, talc, and combinations thereof;
         from about 5% to about 10% by weight of the filler/primer component of pigment;
         from about 1% to about 15% by weight of the filler/primer component of a mixture of thixotropic clays;
         from about 0% to about 2% by weight of the filler/primer component of activated fumed silica;
         from about 1% to about 10% by weight of the filler/primer component of a phosphosilicate;
         from about 0% to about 2% by weight of the filler/primer component of an accelerator; and
         from about 0% to about 20% by weight of the filler/primer component of an organic solvent; and
      (b) a catalyst component.

13. The method of claim 12 wherein the catalyst component is selected from methyl ethyl ketone peroxide and benzoyl peroxide.

14. The method of claim 12 wherein the accelerator is selected from dimethyl aniline, cobalt naphthenate, copper naphthenate, potassium hexanoate, dimethyl para toluidine, cobalt neodecanoate, and mixtures thereof.

15. The method of claim 14 wherein the accelerator comprises from about 0.2% to about 2% by weight of the filler/primer component.

16. The method of claim 12 wherein the filler/primer component further comprises about 0% to about 12% by weight of the filler/primer component of a styrene monomer.

17. The method of claim 12 wherein the solvent is a blend of 50% acetone and 50% ethyl acetate.

18. The method of claim 17 wherein the solvent comprises about 10% to about 20% by weight of the filler/primer component.

19. The method of claim 12 wherein the phosphosilicate comprises calcium strontium zinc phosphosilicate.

20. The method of claim 12 wherein the catalyst component comprises about 2% to about 4% by weight of the total coating.

21. The method of claim 12 wherein said pigment is titanium dioxide.

22. A method of treating a wood surface comprising:
   providing the wood surface;
   coating the wood surface with a coating comprising:
      (a) a filler/primer component comprising:
         about 20% to about 30% by weight of the filler/primer component of a vinyl ester resin;
         about 2% to about 10% by weight of the filler/primer component of a polyester resin;
         about 5% to about 10% by weight of the filler/primer component of a styrene monomer;
         about 25% to about 35% by weight of the filler/primer component of a sprayable filler selected from calcium carbonate, talc, and combinations thereof;
         about 5% to about 10% by weight of the filler/primer component of pigment;
         about 1% to about 4% by weight of the filler/primer component of a mixture of thixotropic clays;
         about 0.5% to about 2% by weight of the filler/primer component of activated fumed silica;
         about 1% to about 10% by weight of the filler/primer component of a phosphosilicate;
         about 0.5% to about 2% by weight of the filler/primer component of an accelerator;
         about 0% to about 0.8% by weight of the filler/primer component of acrylic resin; and
         about 10% to about 20% by weight of the filler/primer component of an organic solvent; and
      (b) a catalyst component.

* * * * *